UNITED STATES PATENT OFFICE 2,688,584

NEW AMIDES, PROCESS OF PRODUCING, AND REPELLENTS CONTAINING SAME

Gustav Eduard Utzinger, Basel, Switzerland, assignor to Cilag Limited, Schaffhausen, Switzerland, a Swiss company No Drawing. Application April 16, 1952, Serial No. 282,671

10 Claims. (Cl. 167—30)

This invention relates to new amides of the general formula

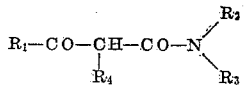

in which $R_1$, $R_2$ and $R_3$ represent lower alkyl radicals, and $R_4$ represents an aralkyl radical or a halogen, alkyl and alkoxy substituted aralkyl radical. It was found that these amides constitute most effective insect-repelling agents.

Dialkyl amides of aromatic acids have been described as repellents of good action (Patent No. 2,408,389, granted October 1, 1946, to Samuel I. Gertler). However, experience has shown that these amides do not meet cosmetic requirements (Dethier, Chemical Insect Attractants and Repellents, pages 214–216, The Blakiston Company, 1947).

It was, therefore, surprising to find that compounds of the above indicated formula are able to meet fully all cosmetic requirements.

The compounds of my invention may be applied as such, or together with solvents and diluents, respectively, in form of emulsions, dispersions, pastes, creams, powders or aerosols. Mixtures of my compounds may be used as well.

It has proved advantageous to add to my α-benzyl aceto acetic acid dialkyl amides an activator which has a synergystic effect on these amides. As such activators, for instance, 4,6,6-trialkyl cyclohexene(3)on(2)carboxylic acid dialkyl and alkyl-aryl amides of the formula

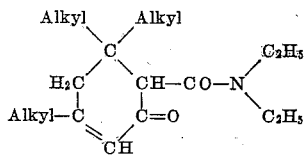

have proved useful. Especially 4,6,6-trimethyl cyclohexene(3)on(2)carboxylic acid diethyl amide of a melting point of 57–58° is very effective. These cyclohexenone activators and a method of their preparation are disclosed in my Patent No. 2,677,705, granted May 4, 1954.

As an example for a repellent solution of good action the following mixture may be mentioned:

10% α-(2-chlorobenzyl) aceto acetic acid diethyl amide,

10% α-(4-chlorobenzyl) aceto acetic acid diethyl amide,

5% 4,6,6-trimethyl cyclohexene(3)on(2)carboxylic acid diethyl amide,

75% isopropanol.

A further object of the invention is to provide a process for the production of my compounds. According to my process, an acyl acetic acid dialkyl amide of the formula

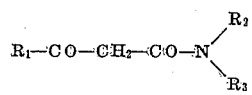

in which $R_1$, $R_2$ and $R_3$ have the aforementioned meanings is aralkylated, in the presence of a basic condensation agent, with the aid of a reactive ester of an aralkanol of the formula

R₄OH in which $R_4$ has likewise the aforesaid meaning.

Preferably, hydrogen halide esters of aralkanols are used, for instance, benzyl halogenides, and halogen, alkyl or alkoxy substituted benzyl halogenides. To carry out the process invention, it is not necessary to start from the pure halogen, alkyl or alkoxy substituted benzyl halogenides. For instance, a mixture of 2- and 4-halogen benzyl halogenides or of mono and dihalogen benzyl halogenides may easily be reacted with an acyl acetic acid dialkyl amide. As basic condensation agents, for instance, alkali alcoholates, alkali hydroxides or carbonates in alcoholic solution may be used.

The following examples shall illustrate the invention without limiting same.

EXAMPLE 1

*α-(2-chlorobenzyl) aceto acetic acid diethyl amide*

20 gms. of aceto acetic acid diethyl amide are shaken or stirred in a solution of 150 cc. of methanol with 6 gms. of powdered caustic potash until all dissolves whereupon to the solution 20 gms. of chlorobenzyl chloride are added and the whole is put aside for 3 days at room temperature. The solution which no longer reacts alkaline to phenolphthalein is filtered from the separated potassium chloride. The solution is evaporated. The oily residue is dissolved in 100 cc. of isopropyl ether, washed with water, the ether solution is separated again, dried with sodium sulfate and evaporated. The oily residue is vacuum distilled. 27 gms. of α-(2-chlorobenzyl) aceto acetic acid diethyl amide are obtained as an odorless, viscose oil, B. P. 0.01 mm., 143–145°, the greater part of which crystallizes. Recrystallized from ligroin, it melts at a temperature of 49°. A small and not crystallizing part represents β-(2-chlorobenzyloxy) crotonic acid diethyl amide of the formula

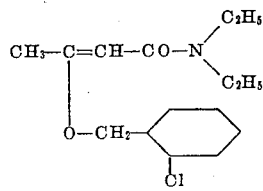

which distills at 0.01 mm. at 147–149°.

EXAMPLE 2

*α-(2,4-dichlorobenzyl) aceto acetic acid diethyl amide*

According to Example 1, 20 gms. of aceto acetic acid diethyl amide in 150 cc. of methanol with 6 gms. of powdered caustic potash are added to 27 gms. of 2,4-dichlorobenzyl chloride. After three days, the reaction mass is treated as indicated in Example 1. In this way, 29 gms. of α-(2,4-dichlorobenzyl) aceto acetic acid diethyl amide are obtained as a viscose oil which boils at 0.1 mm. at 161–163° and is easily soluble in the usual organic solvents.

EXAMPLE 3

*Mixture of α-(2-chlorobenzyl) and α-(4-chlorobenzyl) aceto acetic acid diethyl amides*

20 gms. of sodium wire are reacted on the steam bath with 500 cc. of isopropyl alcohol and the reaction is suppressed a short time before boiling starts by cooling the flask with water. Upon completion of reaction and cooling, sodium isopropylate crystallizes out. The mass is then reacted under stirring with 130 gms. of aceto acetic acid diethyl amide and 170 gms. of a mixture of 2- and 4-chlorobenzyl chloride. The crystals of sodium isopropylate slowly dissolve and fine-grained sodium chloride separates. The reaction mixture is put aside for 10 days and is then sucked off from the sodium chloride, and from the filtrate the isopropyl alcohol is distilled. 240 gms. of residue remain which is shaken in a separating funnel with 50 cc. of cold 5 N hydrochloric acid. A colorless oily layer separates and is stirred with 50 gms. of solid potash for 3 hours. The clear oil is now fractioned. After a small forerun of 2- and 4-chlorobenzyl alcohol, the mixture of α-(2-chlorobenzyl) and α-(4-chlorobenzyl) aceto acid diethyl amides distill under 0.05 mm. Hg. at 145–152°. Yield about 160–180 gms. The reaction mixture obtained in this way is easily soluble in the usual organic solvents, but little soluble in water.

In a similar way may be obtained:

α-(4-bromobenzyl) aceto acetic acid diethyl amide
α-(2-bromobenzyl) aceto acetic acid diethyl amide
α-(2,4-dibromobenzyl) aceto acetic acid diethyl amide
α-(2-chloro-4-methylbenzyl) aceto acetic acid diethyl amide
α-(3,4-dimethylbenzyl) aceto acetic acid diethyl amide
α-(3,4-methylene dioxybenzyl) aceto acetic acid diethyl amide
α-(2,4,6-trimethylbenzyl) aceto acetic acid dimethyl amide

What I claim is:

1. The new chemical compound of the formula

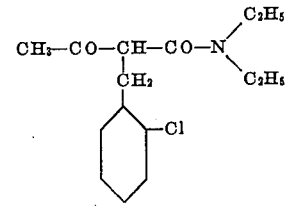

2. Process according to claim 8, comprising reacting aceto acetic acid diethyl amide in the presence of alcoholic caustic potash solution with 2-chlorobenzyl chloride whereby α-(2-chlorobenzyl) aceto acetic acid diethyl amide is obtained.

3. Process according to claim 8, comprising reacting aceto acetic acid diethyl amide in the presence of alcoholic caustic potash solution with 2,4-dichlorobenzyl chloride, whereby α-(2,4-dichlorobenzyl) aceto acetic acid diethyl amide is obtained.

4. Process according to claim 8, comprising reacting aceto acetic acid diethyl amide in the presence of sodium isopropylate with a mixture of 2- and 4-chlorobenzyl chloride whereby a mixture of α-(2-chlorobenzyl) and α-(4-chlorobenzyl) aceto acetic acid diethyl amides is obtained.

5. A composition as in claim 9, containing 10% of α-(2-chlorobenzyl) aceto acetic acid diethyl amide, 10% of α-(4-chlorobenzyl) aceto acetic acid diethyl amide, 5% of 4,6,6-trimethyl cyclohexene (3) on (2) carboxylic acid diethyl amide, and 75% of isopropanol.

6. New benzyl acyl acetic acid dialkyl amides of the general formula

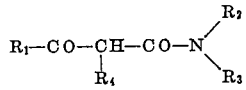

in which $R_1$, $R_2$ and $R_3$ represent lower alkyl radicals, $R_4$ is a substituent selected from the group consisting of a chlorine substituted benzyl radical, and a bromine substituted benzyl radical.

7. The new compound of the formula

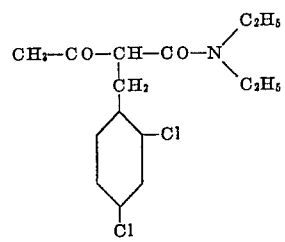

8. Process for the production of new benzylated acyl acetic acid dialkylamides of the general formula

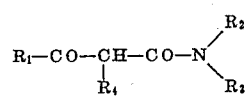

in which $R_1$, $R_2$ and $R_3$ represent lower alkyl radicals, and $R_4$ is a substituent selected from the group consisting of a chlorine substituted benzyl radical, and a bromine substituted benzyl radical, comprising reacting a compound of the formula

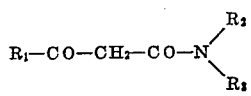

in which $R_1$, $R_2$ and $R_3$ represent lower alkyl radicals, in the presence of a basic condensation agent with a hydrohalide ester of a benzyl alcohol of the formula $$R_4OH$$

in which $R_4$ is a substituent selected from the group consisting of a chlorine substituted benzyl radical, and a bromine substituted benzyl radical.

9. A new composition having a strong repellent action against gnats, containing as an active ingredient at least a compound of the formula

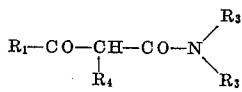

wherein $R_1$, $R_2$ and $R_3$ represent a lower alkyl radical, and $R_4$ is a substituent selected from the group consisting of a chlorine substituted benzyl radical, a bromine substituted benzyl radical, an activator selected from the group consisting of 4,6,6-trialkyl cyclohexene (3) on (2) carboxylic acid-N,N-dialkylamide and 4,6,6-trialkyl cyclohexene (3) on (2) carboxylic acid-N-aryl-N-alkyl amide, and a lower alkanol as a solvent.

10. A new composition having a strong repellent action against gnats, containing as an active ingredient at least a compound of the formula

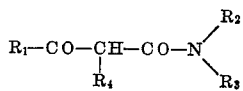

wherein $R_1$, $R_2$ and $R_3$ represent a lower alkyl radical, and $R_4$ is a substituent selected from the group consisting of a chlorine substituted benzyl radical, a bromine substituted benzyl radical, an activator selected from the group consisting of a 4,6,6-trialkyl cyclohexene(3) on(2) carboxylic acid-N,N-dialkyl-amide and 4,6,6-trialkyl cyclohexene (3) on (2) carboxylic acid-N-aryl-N-alkyl amide, and an emulsifying agent which lowers the surface tension of water and thereby promotes aqueous emulsions of the active ingredient and the activator.

References Cited in the file of this patent

UNITED STATES PATENTS

| Number | Name | Date |
|---|---|---|
| 2,408,389 | Gertler | Oct. 1, 1946 |
| 2,581,840 | Drake et al. | Jan. 8, 1952 |
| 2,581,842 | Drake et al. | Jan. 8, 1952 |
| 2,592,890 | Gysin | Apr. 15, 1952 |

OTHER REFERENCES

Cook et al., "J. Am. Chem. Soc.," vol. 70 (1948), pp. 1918 and 1919.

Chelinizev et al., "Ber. deut. Chem.," vol. 69 (1936), pp. 2023 to 2026.

Dubinin et al., "Chemical Abstracts," vol. 32 (1938), page 2123.

Smith et al., "Effectiveness of Repellents Applied to Clothing . . .," J. Econ. Entomology, June 1949, pp. 439 to 444, especially pp. 440 and 441, N,N-di-iso-butylacetoacetamide and N,N-diethylacetoacetamide.